United States Patent
Argo

(10) Patent No.: US 6,983,037 B2
(45) Date of Patent: Jan. 3, 2006

(54) METHOD, SYSTEM AND COMPUTER PROGRAM PRODUCT FOR PERFORMING AUTOMATED UNBUNDLED NETWORK ELEMENT MIGRATION

(75) Inventor: James Lee Argo, Monroe, GA (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 108 days.

(21) Appl. No.: 10/444,583

(22) Filed: May 23, 2003

(65) Prior Publication Data

US 2004/0234043 A1 Nov. 25, 2004

(51) Int. Cl.
- H04M 1/24 (2006.01)
- H04M 3/08 (2006.01)
- H04M 7/00 (2006.01)

(52) U.S. Cl. .............................. 379/15.03; 379/201.12; 379/219; 379/221.13

(58) Field of Classification Search ................ 379/1.01, 379/9, 14, 15.03, 19, 201.03, 201.12, 207.02, 379/219, 221.13
See application file for complete search history.

(56) References Cited

U.S. PATENT DOCUMENTS

| | | | | |
|---|---|---|---|---|
| 5,627,827 A | * | 5/1997 | Dale et al. .................. | 370/359 |
| 6,130,941 A | * | 10/2000 | Nimmagadda et al. ..... | 379/230 |
| 6,301,351 B1 | * | 10/2001 | King ...................... | 379/221.01 |
| 6,657,994 B1 | * | 12/2003 | Rajakarunanayake ....... | 370/352 |
| 6,661,888 B2 | * | 12/2003 | Bell et al. .............. | 379/221.13 |
| 6,711,251 B1 | * | 3/2004 | Kieren .................. | 379/221.13 |
| 6,766,008 B2 | * | 7/2004 | Teixeira ................. | 379/221.02 |
| 2002/0159580 A1 | | 10/2002 | Bell et al. | |

OTHER PUBLICATIONS http://www.turnstonesystems.com/solutions/une/index.asp.
http://www.turnstonesystems.com/solutions/white_paper/white_paper_une_management.asp.

* cited by examiner

Primary Examiner—Quoc Tran
(74) Attorney, Agent, or Firm—Cantor Colburn LLP

(57) ABSTRACT

A method for performing automated UNE migration comprising receiving a disconnect order for an existing telephone service and receiving a connect order for a new telephone service. The existing telephone service is provided by a first exchange carrier and the new telephone service is provided by a second exchange carrier. A test cable is installed to simulate the new telephone service. The method further comprises verifying that the test cable performs correctly. The verifying includes executing a test on the test cable responsive to a test instruction from a migration software application. The existing telephone service is deactivated, where the deactivating is automated in response to a deactivation command from the migration software application and is responsive to said verifying. The test cable is activated to provide the new telephone service, where the activating is automated in response to an activation command from the migration software application and in response to the deactivating.

31 Claims, 7 Drawing Sheets

METHOD, SYSTEM AND COMPUTER PROGRAM PRODUCT FOR PERFORMING AUTOMATED UNBUNDLED NETWORK ELEMENT MIGRATION

BACKGROUND OF THE INVENTION

The present disclosure relates generally to a method for performing automated unbundled network element (UNE) migration and in particular, to a method of automating the process for performing UNE migration and management.

Local loop unbundling is an important component of deregulation. By giving Competitive Local Exchange Carriers (CLECs) equal access to the Incumbent Local Exchange Carrier's (ILEC's) copper infrastructure, a competitive environment is created for the delivery of voice and data services. Cutting over an unbundled local loop (ULL) can be a costly endeavor for an ILEC. It can consume significant time and manpower resources, and may result in stiff regulatory penalties for failure to meet wholesale delivery standards. ILEC wholesale UNE businesses are growing rapidly. In the United States, ILECs reported providing about 6.8 million lines to other carriers on a resale basis at the end of the year 2000, up from about 5.7 million lines six months earlier. These rapidly growing revenues are becoming a significant part of the future business plans of ILECs.

Regulators have defined strict standards by which ILECs must deliver UNEs. For example, with unbundled local loops (ULLs), if the time window for cutting over a loop is missed, or if the delivered loop is not operational, regulators impose fines on the ILECs. As loop cut-over is a manual process that requires several skilled technicians performing cut-overs and loop testing at the central office (CO) (often after regular work hours), ULL management can result in significant operational expenditures. Adding to these expenses are the heavy fines that can be assessed for cut-over errors and/or missed deadlines. As a result, as the wholesale loop business continues to grow, service providers are looking to find ways to improve the operational efficiencies of wholesale loop management.

In today's environment, the cut-over process is largely a manual effort. With a coordinated loop cut-over, the service providers work together to ensure as seamless a cut-over for voice service as possible. While some of the work is done ahead of time (i.e., before the alotted cut-over "window"), several technicians and supervisors are still required to stand by at the time of the actual cut-over. The typical steps taken for the cut-over include:

1. New service change order created.

2. Jumper placed from a CLEC main distribution frame (MDF) to an ILEC MDF. The jumper within the ILEC MDF frame to the plain old telephone service (POTS) port is left unconnected. Voice service continues as before. The missing jumper isolates the wholesale customer's (i.e., the CLEC) voice switch from the in-service voice circuit.

3. At the time of the coordinated cut-over, the voice switch port is turned off, or disconnected.

4. The last jumper is then put in place in the ILEC MDF. At a minimum, the ILEC's network operations center (NOC), the CLEC's NOC and a frame technician are all involved and standing by during the time coordinated window. Additional resources may also be standing by.

5. The CLEC verifies that the service is functional. If it is not, error analysis and correction (i.e., trouble shooting) is performed manually by a CO technician, since the loop is not likely to be accessible from the ILEC's testing systems. Potential problems are in the CO jumpers, either a wrong port or a poor punch down, the CLEC's wiring or the CLEC voice port configuration.

There is much that can go wrong in this process. For example, on the ILEC side, the jumpers may have been placed incorrectly, either to the wrong port or possibly a poor punch down. On the wholesale customer's side, the switch may not be properly provisioned or the wiring may be faulty. When a problem does occur, it can be a challenge to isolate the fault due to the testing being performed manually, since the loop is not likely to have test functionality once it has been cut-over. This requires technicians (and supervisors) on site at the time of the cut-over and causes significant cost to service providers. As troubleshooting often takes several hours, in many instances, the cut-over window is closed by the time the problem is identified. As a result, the cut-over must be rescheduled for a new window, adding to the ILEC's expenditures.

Another problem has to do with escalating costs. As ULL line counts continue to grow rapidly, escalating costs are of concern. Scaling wholesale head count is expensive, particularly on time-coordinated handoffs where all coordinated work must be performed during restricted time frames, typically late at night when technicians are earning overtime pay. The process requires that several ILEC personnel be at a specific place at a specific time, which is inefficient, as there is no opportunity to batch tasks. Circuit visibility can also be a problem. Once the ULL is delivered to the CLEC, the ILEC provider loses visibility and test access to the circuit. No testing means that a technician-dispatch is required to respond to trouble reports. This may lead to an extended mean time to repair (MTTR) and customer dissatisfaction. A further problem is the regulatory challenges. Performance metrics are regulated and monitored closely by the Federal Communications Commission (FCC) and the state Public Utility Commissions (PUCs). With current practices, the onus is completely on the ILEC to assure that the cut-over goes smoothly.

BRIEF DESCRIPTION OF THE INVENTION

One aspect of the present invention is a method for performing automated UNE migration comprising receiving a disconnect order for an existing telephone service and receiving a connect order for a new telephone service. The existing telephone service is provided by a first exchange carrier and the new telephone service is provided by a second exchange carrier. A test cable is installed to simulate the new telephone service. The method further comprises verifying that the test cable performs correctly. The verifying includes executing a test on the test cable responsive to a test instruction from a migration software application. The existing telephone service is deactivated, where the deactivating is automated in response to a deactivation command from the migration software application and is responsive to said verifying. The test cable is activated to provide the new telephone service, where the activating is automated in response to an activation command from the migration software application and in response to the deactivating.

In another aspect, a system for performing automated UNE migration comprises a network and an existing telephone service voice switch in communication with the network. The system further comprises an existing telephone service main distribution frame in communication with the existing telephone service voice switch and a customer telephone in communication with the existing telephone service main distribution frame. In addition, the system comprises a new telephone service voice switch, a remote cross connection device in communication with the new telephone service voice switch and with the network, and a new telephone service main distribution frame in communication with the remote cross connection device. The system further comprises a deactivated test cable in communication with the existing telephone service main distribution frame and the new telephone service main distribution frame, and a host system in communication with the network. The host system includes instructions to implement a method comprising receiving a disconnect order for the existing telephone service and receiving a connect order for the new telephone service. The existing telephone service is provided by a first exchange carrier and the new telephone service is provided by a second exchange carrier. The method also comprises verifying that the test cable performs correctly, where the verifying includes executing a test on the test cable responsive to a test instruction from a migration software application located on the host system. The existing telephone service is deactivated, where the deactivating is automated in response to a deactivation command from the migration software application and is responsive to the verifying. The test cable is activated to provide the new telephone service, where the activating is automated in response to an activation command from the migration software application and in response to the deactivating.

Another aspect of the present invention is a computer program product for performing automated UNE migration comprising a storage medium readable by a processing circuit and storing instructions for execution by the processing circuit for performing a method. The method comprises receiving a disconnect order for an existing telephone service and receiving a connect order for a new telephone service. The existing telephone service is provided by a first exchange carrier and the new telephone service is provided by a second exchange carrier. A test cable is installed to simulate the new telephone service. The method further comprises verifying that the test cable performs correctly. The verifying includes executing a test on the test cable responsive to a test instruction from a migration software application. The existing telephone service is deactivated, where the deactivating is automated in response to a deactivation command from the migration software application and is responsive to said verifying. The test cable is activated to provide the new telephone service, where the activating is automated in response to an activation command from the migration software application and in response to the deactivating.

BRIEF DESCRIPTION OF THE DRAWINGS

Referring to the exemplary drawings wherein like elements are numbered alike in the several Figures:

FIG. 6 is an exemplary user interface for reviewing the overall status of UNE migration work orders; and FIG. 7 is an exemplary user interface for reviewing the details of a UNE migration work order.

DETAILED DESCRIPTION OF THE INVENTION

An exemplary embodiment of the present invention is directed to a method for automating the process associated with wholesale UNE service delivery. Briefly, an embodiment of the present invention allows an ILEC technician to remotely program and complete the migration from an ILEC switch to a CLEC switch with a few keystrokes using UNE migration software to drive the associated hardware. When a order for migration is received it is entered into the UNE migration software which creates an electronic work order including a list of the steps to be completed as part of the migration. Steps included in the work order may be pre-wired at the ILEC central office and if outside work is required it may be prearranged. The ILEC technician may then verify the connections and perform testing prior to the cut-over time. Once all testing and verification are completed, the ILEC technician may utilize a screen in the UNE migration software to schedule the specific cut-over time. Once the time has elapsed, test results and notification to the CLEC are automatically generated, and cut-over orders are completed. The UNE migration software facilitates the cut-over process from an ILEC to a CLEC and vice versa. The software includes instructions that define, enforce, and document cut-over work steps and drive automated equipment to physically handle the cut-over of copper from one provider to another. In addition, once the migration to a CLEC has been completed, the ILEC retains test access to the equipment.

Figure 1:
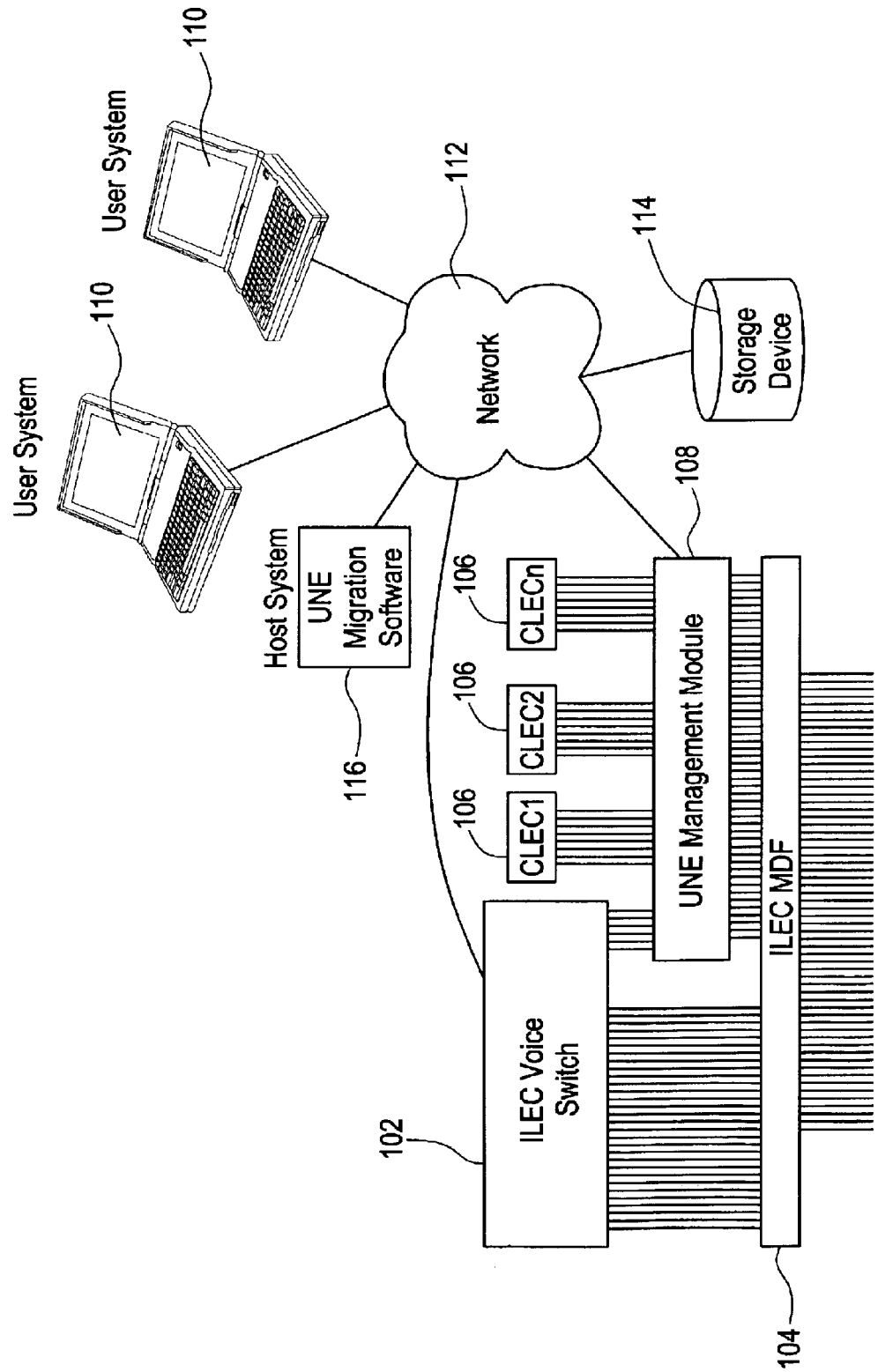
FIG. 1 is a block diagram of an exemplary system for performing automated UNE migration.

FIG. 1 is a block diagram of an exemplary system for performing UNE migration. The system includes an ILEC voice switch 102 that may be implemented by any type of voice switch known in the art that can perform switching in response to application program commands such as a Class 5 switch that provides end-customer services including call waiting and call forwarding. An ILEC MDF 104 is also included in the system to provide a wiring arrangement to connect the telephone lines coming from customer telephones on one side, to lines internal to the ILEC switching office on the other. The ILEC MDF 104 depicted in FIG. 1 is connected to an ILEC voice switch 102 via a cable to support ILEC service and to a UNE management module 108 via a cable to support CLEC service. In an exemplary embodiment of the present invention, the UNE management module 108 includes a remote cross connection device, an ILEC MDF and a connection to UNE migration software for driving the remote cross connection device. In an alternate embodiment, the UNE management module includes a remote cross connection device, an ILEC intermediate distribution frame (IDF) and a connection to UNE migration software for driving the remote cross connection device. Any remote cross connection device known in the art that can perform switching in response to commands from application software may be utilized with an exemplary embodiment of the present invention. In an exemplary embodiment of the present invention, the remote cross connection device is a Turnstone MX500 rack level product. As depicted in FIG. 1, the UNE management module 108 and the ILEC voice switch 102 are connected, via a network 112, to application software located on a host system 116 for directing the execution of the UNE migration. In addition, the UNE management module 108 is connected to one or more of the CLEC voice switches 106 via cables. Similar to the ILEC voice switches 102, the CLEC voice switches 106 may be implemented by any type of voice switch known in the art that can perform switching in response to application program commands.

Also shown in FIG. 1 are user systems 110 through which technicians at one or more geographic locations may contact the host system 116 to initiate the UNE migration and management through the UNE migration software located on the host system 116. The user systems 110 are coupled to the host system 116 via a network 112. Each user system 110 may be implemented using a general-purpose computer executing a computer program for carrying out the processes described herein. The user system 110 may be a personal computer (e.g., a lap top, a personal digital assistant) or a host attached terminal. If the user system 110 is a personal computer, the processing described herein may be shared by a user system 110 and the host system 116 (e.g., by providing an applet to the user system 110).

The network 112 may be any type of known network including, but not limited to, a wide area network (WAN), a public switched telephone network (PSTN) a local area network (LAN), a global network (e.g. Internet), a virtual private network (VPN), and an intranet. The network 112 may be implemented using a wireless network or any kind of physical network implementation known in the art. A user system 110 may be coupled to the host system 116 through multiple networks (e.g., intranet and Internet) so that not all user systems 102 are coupled to the host systems 116 through the same network. One or more of the user systems 102 and the host systems 116 maybe connected to the network 112 in a wireless fashion.

The storage device 114 depicted in FIG. 1 may be implemented using a variety of devices for storing electronic information. It is understood that the storage device 114 may be implemented using memory contained in the host system 116 or it may be a separate physical device. The storage device 114 is logically addressable as a consolidated data source across a distributed environment that includes a network 112. The physical data may be located in a variety of geographic locations depending on application and access requirements. Information stored in the storage device 114 may be retrieved and manipulated via the host systems 116. The storage device 114 includes UNE migration and management data such as the UNE management database that includes all open work orders. The storage device 114 may also include other kinds of data such as information concerning updates to the UNE migration work orders (e.g., a user identifier, date, and time). In an exemplary embodiment of the present invention, the host system 116 operates as a database server and coordinates access to application data including data stored on the storage device 114.

The host system 116 depicted in FIG. 1 may be implemented using one or more servers operating in response to a computer program stored in a storage medium accessible by the server. The host system 116 may operate as a network server (e.g., a web server) to communicate with the user systems 102. The host system 116 handles sending and receiving information to and from the user systems 102 and can perform associated tasks. The host system 116 may also include a firewall to prevent unauthorized access to the host system 116 and enforce any limitations on authorized access. For instance, an administrator may have access to the entire system and have authority to modify portions of the system. A firewall may be implemented using conventional hardware and/or software as is known in the art. In an exemplary embodiment of the present invention, the host system 116 is physically integrated into the remote cross connection device with access to the network 112.

The host system 116 may also operate as an application server. The host system 116 executes one or more computer programs to support UNE migration functions such as disconnecting an ILEC voice line and connecting a CLEC voice line. The remote cross connection device and the ILEC voice switch device 102 are responsive to commands from the UNE migration software located on the host system 116. In addition, the UNE migration software includes functions to track work orders, to facilitate new work order entry via a template to provide an audit trail, and to support user customized reporting on the status of the work orders. Processing may be shared by the user systems 102 and the host system 116 by providing an application (e.g., java applet) to the user systems 102. Alternatively, the user systems 102 may include stand-alone software applications for performing a portion or all of the processing described herein. As previously described, it is understood that separate servers may be utilized to implement the network server functions and the application server functions. Alternatively, the network server, the firewall, and the application server may be implemented by a single server executing computer programs to perform the requisite functions.

The UNE migration software 304 may be integrated with existing systems such as legacy systems or third party systems. For example, the UNE migration software may be integrated into a TELECORDIA environment to automate the cut-over process based on data included in order entry and provisioning systems, inventory design and assign systems, activation workflow and test systems and activation systems.

Figure 2:
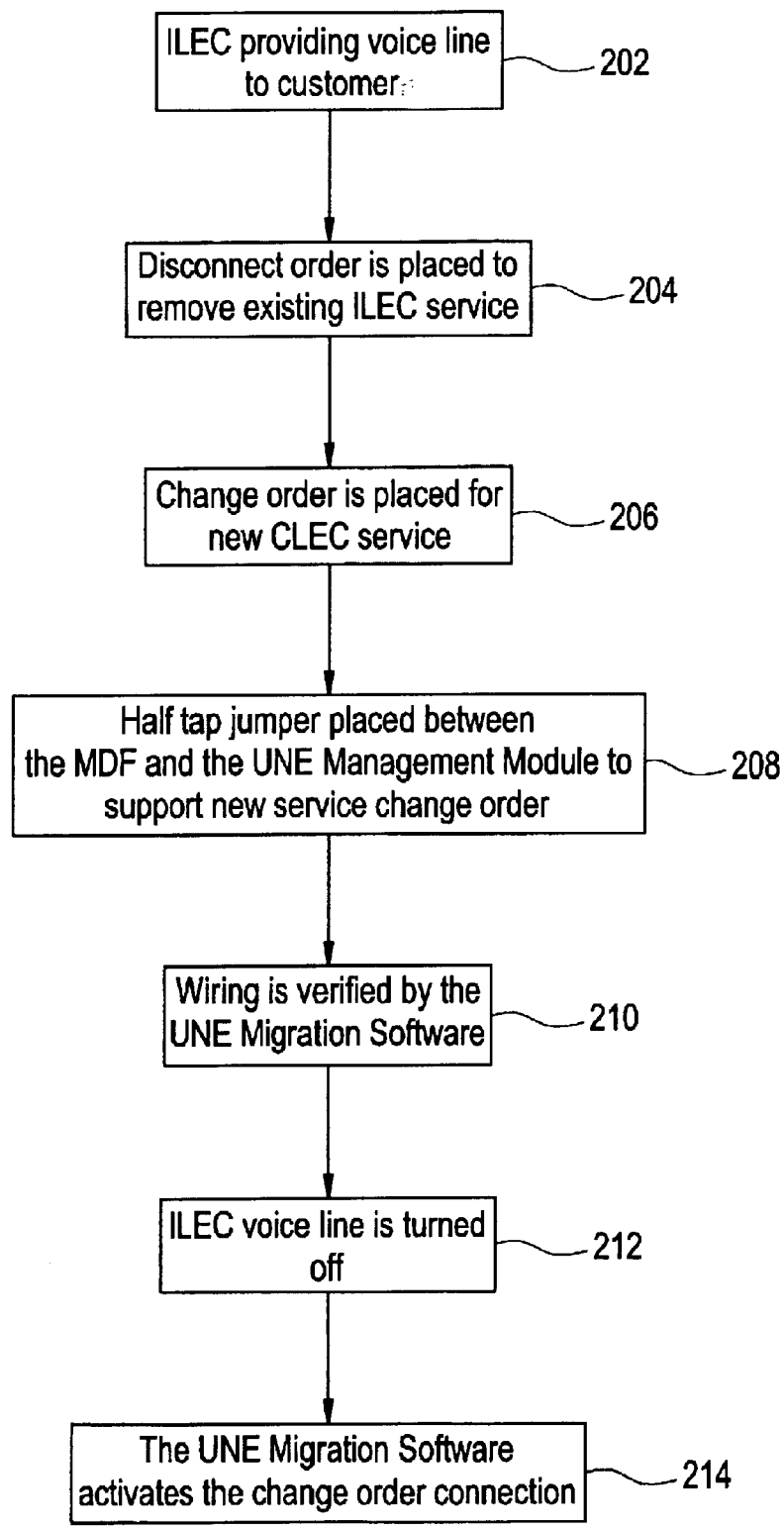
FIG. 2 is a flow diagram of an exemplary process flow for performing automated UNE migration.

FIG. 2 is a flow diagram of an exemplary process flow for performing UNE migration. The process begins at step 202 where the ILEC is providing a voice line to a customer. The voice line is provided by a cable connecting the ILEC MDF 104 and the ILEC voice switch 102. At step 204, a disconnect order is placed in response to notification by the customer to remove the existing ILEC voice line service. Step 206 includes a change order being placed for new CLEC service in response to notification by the customer. At step 208, a jumper cable is placed between the ILEC MDF 104 and the UNE management module 108 to support the new service change order. In an exemplary embodiment of the present invention, the jumper cable is a half-tap jumper in order to allow testing of the new CLEC voice line service connection before disconnecting the ILEC voice line service.

At step 210, the wiring is verified by the UNE migration software. Verification includes verifying that all connections have been made properly, including verifying: that the CLEC voice switch is properly configured; that the jumpers are in place to the correct ports on both switches; and that there are no shorts in the connections. Additional tests may include pre-qualifying the migrated facilities for a high-speed type service (e.g., ADSL, ISDN) and pre-testing for fault isolation prior to migration. The tests may be performed automatically in response to commands from the UNE migration software 304 with the test results being reported back to the UNE migration software 304. If any of the tests fail, the UNE migration software can initiate remote error analysis and detection. At step 212, the ILEC voice line is turned off and, at step 214 the UNE migration software is provisioned to activate the change order connection to connect the CLEC switch 106 to the customer. The process flow depicted in FIG. 2 is performed for each disconnect order/change order pair, or work order, received by the ILEC.

Figure 3:
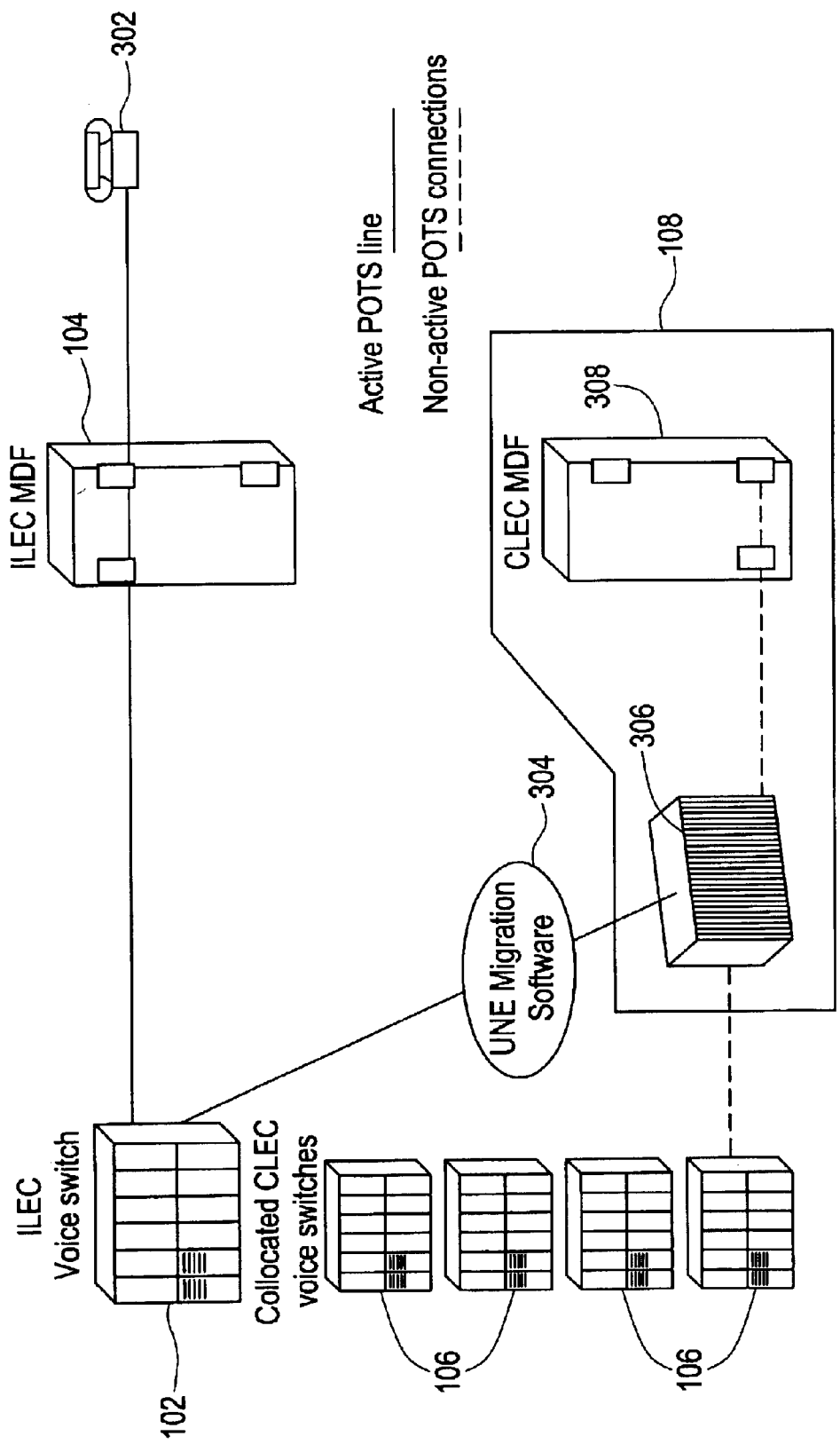
FIG. 3 is a block diagram of an initial stage in performing automated UNE migration utilizing an exemplary embodiment of the present invention.

FIG. 3 is a block diagram of an initial stage in performing UNE migration utilizing an exemplary embodiment of the present invention. FIG. 3 corresponds to the end of step 206 in FIG. 2, after the disconnect and change orders have been placed but not yet serviced. The ILEC voice switch 102 is connected, via an active POTS line, to the ILEC MDF 104. The ILEC MDF 104 is then connected to a customer telephone 302. FIG. 3 also depicts the components of the UNE management module 108 in an exemplary embodiment of the present invention, and as described previously. The UNE management module 108 includes a remote cross connection device 306 connected to a CLEC MDF 308, via a non-active POTS connection. The remote cross connection device is also in communication with the UNE migration management software 304. The CLEC voice switch 106 is connected to the remote cross connection device 306 via a non-active POTS connection. The non-active POTS connections may be put into place by the CLEC or the ILEC in response to the change order. Alternate embodiments of the present invention include other telephone company services such as digital subscriber line (DSL) connections.

Figure 4:
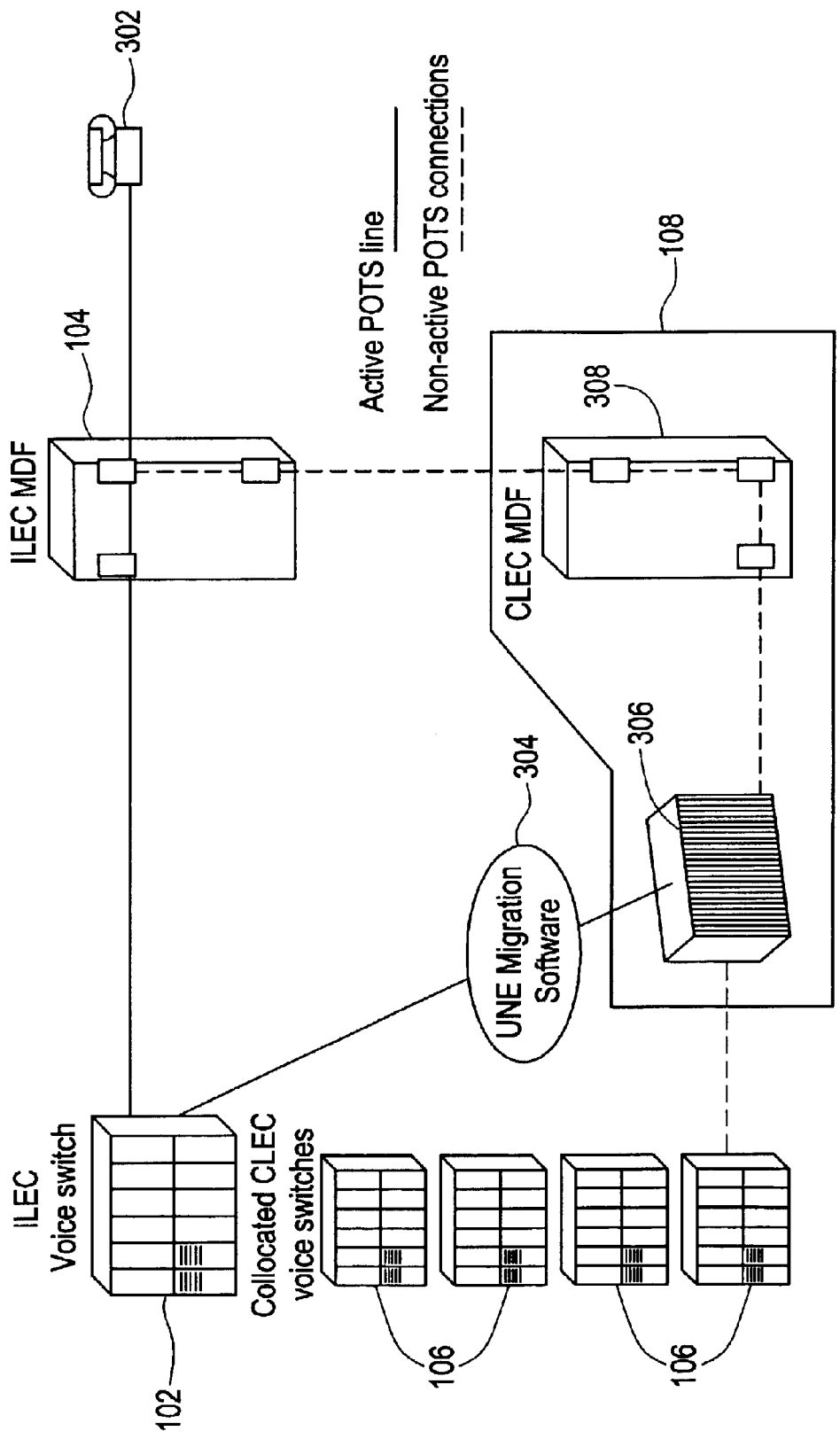
FIG. 4 is a block diagram of an intermediate stage in performing automated UNE migration utilizing an exemplary embodiment of the present invention.

FIG. 4 is a block diagram of an intermediate stage in performing UNE migration utilizing an exemplary embodiment of the present invention. FIG. 4 corresponds to the end of step 210 in FIG. 2. A half-tap jumper is utilized to make the analog trunk appear in two places for simultaneous service for testing the new CLEC connection while the ILEC connection is still in place. The half-tap jumper uses a non-active POTS connection to connect the CLEC MDF 308 portion of the UNE management module 108 to the ILEC MDF 104. In addition, frame jumpers are utilized to connect the equipment and cable on the CLEC MDF 308 to the voice port on the ILEC MDF 104. The wiring is then verified by the remote cross connection device 306 in conjunction with the UNE migration software 304 as described previously. For example verification may include pre-testing for fault isolation and pre-qualifying the migrated facilities for high-speed services.

Figure 5:
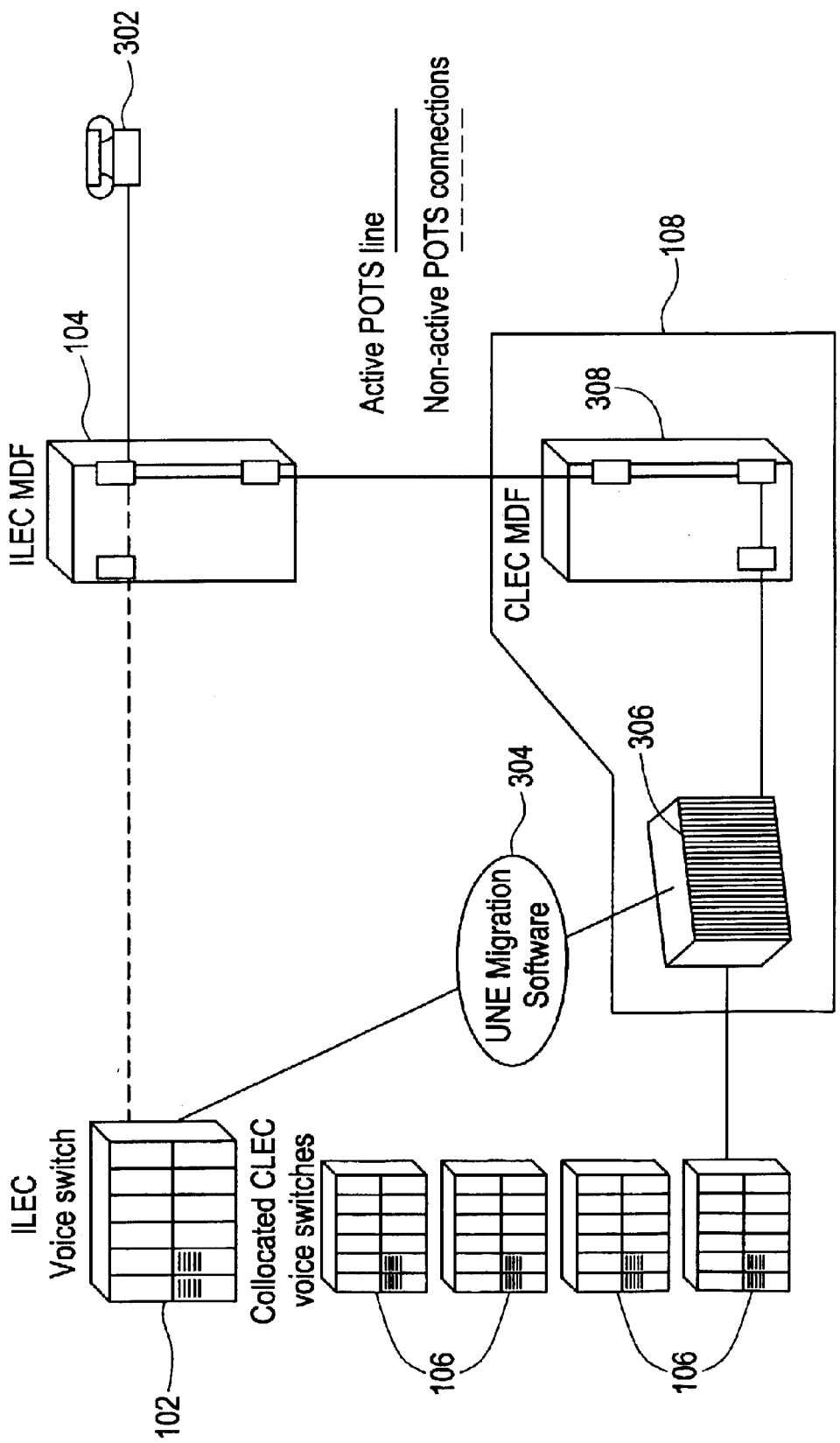
FIG. 5 is a block diagram of a final stage in performing automated UNE migration utilizing an exemplary embodiment of the present invention.

FIG. 5 is a block diagram of a final stage in performing UNE migration utilizing an exemplary embodiment of the present invention. It corresponds to the end of step 214 in FIG. 2 and includes the deactivated ILEC voice line. The POTS line connection between the CLEC voice switch 106 and the remote cross connection device 306 is activated. In addition, the POTS line connections between the cross connection device 306 and the CLEC MDF 308, and between the CLEC MDF 308 and the ILEC MDF 104 are activated. The UNE migration software 304 sends commands to cause the activations and deactivations at the specified cut-over time.

Figure 6:
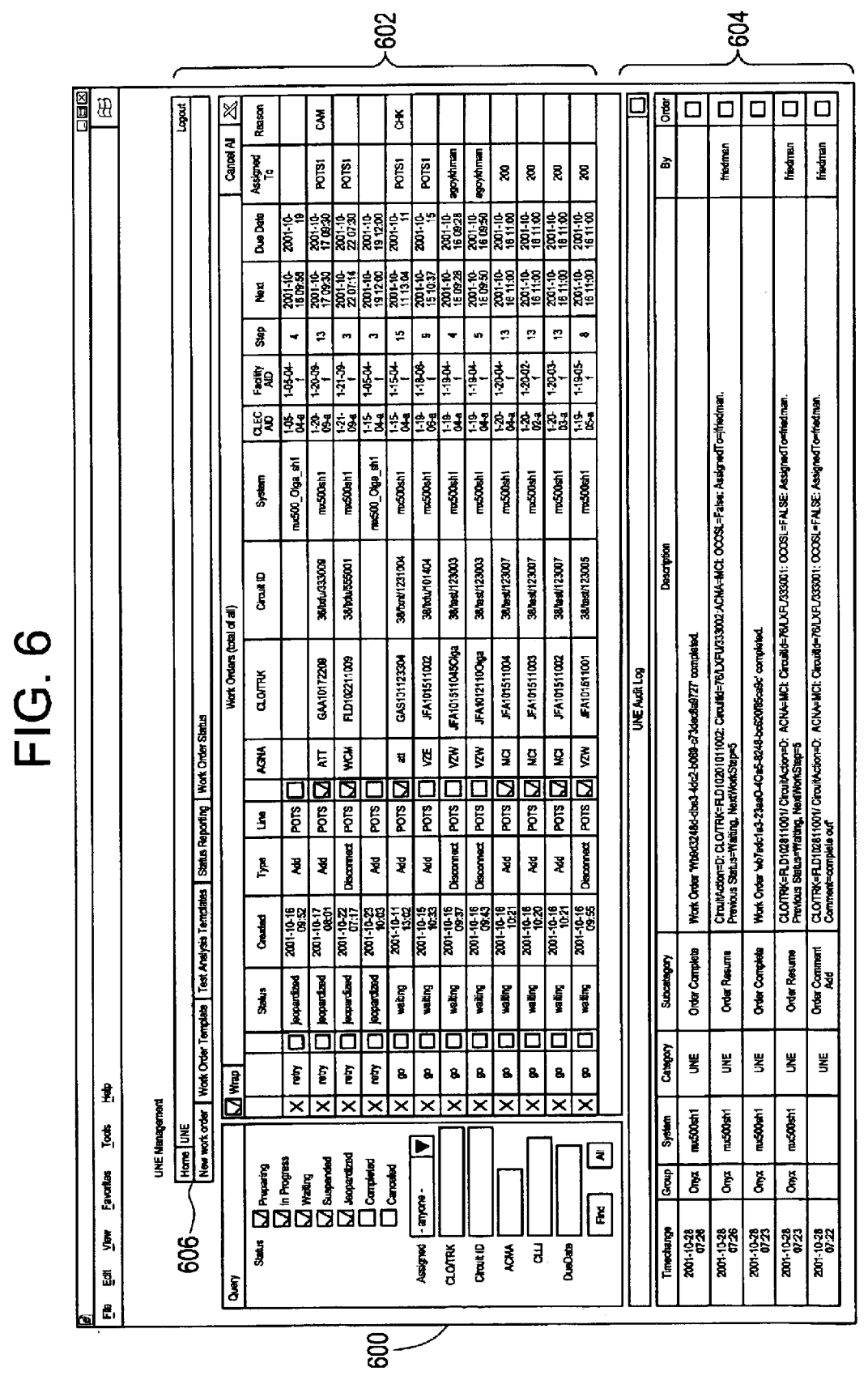

FIG. 6 is an exemplary web based graphical user interface (GUI) for performing management of UNE migrations. The UNE management user interface screen 600 may be accessed by a technician via a user system 110 and results from the technician running a query against the UNE management database located on the storage device 114. The UNE management user interface screen 600 includes a menu bar 606 for selecting a UNE management function such as: new work order, work order template, test analysis template and status reporting. The UNE management user interface screen 600 is displayed in response to the technician selecting status reporting on the menu bar 606. The top section 602 includes query variables on the left (e.g., status of preparing, in progress, suspended, and assigned to anyone) and the remainder of the top section 602 includes the results of the query in response to the selected query variables. All work orders fitting the query criteria are listed including columns for information such as: status, date work order created, type of work order, type of line, the last step completed, the due date and who the person or department that is assigned the work order. The columns of the report may be modified based on technician requirements and canned reports may be created and saved. The report may also be printed for further review by the technician. The bottom section 604 of the UNE management user interface screen 600 includes an audit log the activity associated with the work orders. This audit log may be utilized to verify the date that each step in the work order was performed and may be required by the FCC or by a state PUC.

Figure 7:
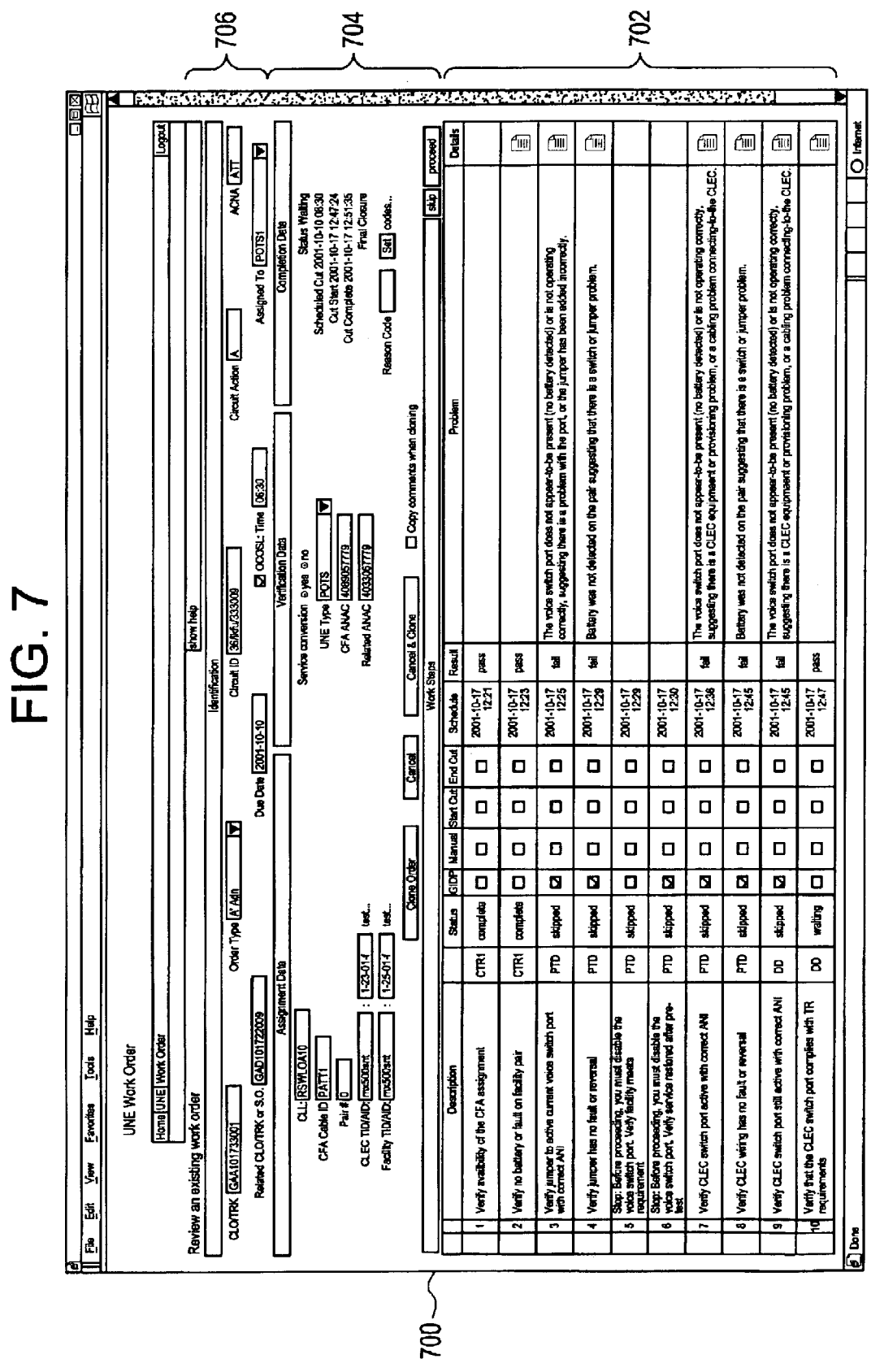

FIG. 7 is an exemplary user interface for reviewing a UNE migration work order. In an exemplary embodiment of the present invention, work orders are created for each CLEC cut-over request. When a work order is created, the UNE migration software 304 creates a list of steps, and associated target dates, to be completed as part of the migration process. The list may be tailored for a particular work order by a technician or for a particular implementation by a system administrator. The completion of each step is verified and recorded before moving on to the next step. The UNE work order user interface screen 700 may be accessed by selecting a work order from the list of work orders appearing on the UNE management user interface screen 600 depicted in FIG. 6 or it may be accessed by selecting the work order status option from the menu bar 606 in FIG. 6. A work order number may be entered in the top section 706 of the UNE work order user interface screen 700. The top section 706 includes information to identify the work order (e.g., Circuit ID). The middle section 704 includes assignment data, verification data and completion data related to the work order. The bottom section 702 lists all the steps included in the work order and the status of the steps including scheduled dates, results (e.g., pass or fail), problems and an attachment facility to attach detailed notes related to the step in the work order. Using this screen, the technicians and/or supervisors may monitor the progress of a work order at any time. Additional screens may include a template screen for stepping a technician through the setting up a new work order with the templates being modifiable to reflect terms utilized in the agreement with the CLEC, or wholesale agreement.

An exemplary embodiment of the present invention includes a method for ILECs to automate the process associated with wholesale UNE service delivery. In doing so, the ILEC can minimize errors, maximize resource utilization, and speed service delivery. This may lead to improved business profitability and better customer satisfaction. In addition, the ability to retain test access to the UNEs after the cut-over may lead to better error diagnosis when a problem occurs with the CLEC migration because the whole system may be tested and not just the portion being utilized by the ILEC. This can also lead to the ability to isolate errors between the ILECs and the CLECs. The ability to integrate the UNE migration software with existing third party and legacy systems may lead to a faster migration to the automated UNE migration system because less rework will be required. The improved reporting included in an exemplary embodiment of the present invention can provide the data reporting capability to audit the work order steps and status in performing the work order in response to CLEC, FCC and PUC requests for information.

As described above, the embodiments of the invention may be embodied in the form of computer-implemented processes and apparatuses for practicing those processes. Embodiments of the invention may also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. An embodiment of the present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. A method for performing automated unbundled network element migration, the method comprising:
   receiving a disconnect order for an existing telephone service wherein said existing telephone service is provided by a first exchange carrier;
   receiving a connect order for a new telephone service wherein said new telephone service is provided by a second exchange server;
   installing a test cable to simulate said new telephone service;
   verifying that said test cable performs correctly, wherein said verifying includes executing a test on said test cable responsive to a test instruction from a migration software application;
   deactivating said existing telephone service, wherein said deactivating is automated in response to a deactivation command from said migration software application and is responsive to said verifying; and
   activating said test cable to provide said new telephone service, wherein said activating is automated in response to an activation command from said migration software application and in response to said deactivating.

2. The method of claim 1 wherein said first exchange carrier is an incumbent local exchange carrier.

3. The method of claim 1 wherein said second exchange carrier is a competitive local exchange carrier.

4. The method of claim 1 wherein said test cable includes a jumper cable.

5. The method of claim 1 wherein said test cable includes a half tap jumper cable.

6. The method of claim 1 wherein said test includes checking that a voice switch associated with said new telephone service is properly configured.

7. The method of claim 1 wherein said test includes checking that there are no shorts in any new telephone service connections.

8. The method of claim 1 wherein said test includes checking that said test cable is in the correct ports.

9. The method of claim 1 wherein said test includes pre-qualifying the migrated facilities for high-speed services.

10. The method of claim 1 wherein said test includes pre-testing for fault isolation.

11. The method of claim 1 wherein said verifying further includes:
   receiving result data in response to said executing a test;
   evaluating said result data; and
   reporting the results of said evaluating.

12. The method of claim 11 wherein said verifying further includes performing error analysis and correction in response to said evaluating.

13. The method of claim 1 wherein said activating is initiated within a pre-selected time interval of initiating said deactivating.

14. The method of claim 13 wherein said pre-selected time interval is ten seconds.

15. The method of claim 1 further comprising:
   combining said disconnect order and said connect order into a work order including migration steps and deadlines;
   transmitting said work order into a management database, wherein said management database includes a plurality of said work orders.

16. The method of claim 15 further comprising creating a template for said work order.

17. The method of claim 15 wherein said combining is performed by said migration software application in response to said receiving a disconnect order and to said receiving a connect order.

18. The method of claim 15 further comprising:
   executing a query against said management database; and
   receiving a report in response to said query.

19. The method of claim 18 wherein said report includes one or more said work orders and the overall status of each said work order.

20. The method of claim 18 wherein said report includes one said work order and the status of each said migration step in said work order.

21. The method of claim 1 further comprising performing error analysis and correction after said deactivating and said activating.

22. A system for providing automated unbundled network element migration, the system comprising:
   a network;
   an existing telephone service voice switch in communication with said network;
   an existing telephone service main distribution frame in communication with said existing telephone service voice switch;
   a customer telephone in communication with said existing telephone service main distribution frame;
   a new telephone service voice switch;
   a remote cross connection device in communication with said new telephone service voice switch and with said network;
   a new telephone service main distribution frame in communication with said remote cross connection device;
   a deactivated test cable in communication with said existing telephone service main distribution frame and said new telephone service main distribution frame; and a host system in communication with said network and including instructions to implement a method comprising:
- receiving a disconnect order for said existing telephone service via said network, wherein said existing telephone service is provided by a first exchange carrier;
- receiving a connect order for said new telephone service via said network wherein said new telephone service is provided by a second exchange carrier;
- verifying that said test cable performs correctly, wherein said verifying includes executing a test on said test cable responsive to a test instruction from a migration software application located on said host system;
- deactivating said existing telephone service, wherein said deactivating is automated in response to a deactivation command from said migration software application and is responsive to said verifying; and
- activating said test cable to provide said new telephone service, wherein said activating is automated in response to an activation command from said migration software application and in response to said deactivating.

23. The system of claim 22 wherein said deactivating includes disabling said communication between said existing telephone service voice switch and said existing telephone service main distribution frame.

24. The system of claim 22 wherein said activating includes activating communication between said existing telephone service main distribution frame and said new telephone service main distribution frame.

25. The system of claim 22 wherein said first exchange carrier is an incumbent local exchange carrier.

26. The system of claim 22 wherein said second exchange carrier is a competitive local exchange carrier.

27. The system of claim 22 wherein said test cable includes a jumper cable.

28. The system of claim 22 wherein said test cable includes a half tap jumper cable.

29. The system of claim 22 wherein said network is the Internet.

30. The system of claim 22 wherein remote cross connection device is a Turnstone MX500.

31. A computer program product for providing automated unbundled network element migration, the computer program product comprising:
- a storage medium readable by a processing circuit and storing instructions for execution by the processing circuit for performing a method comprising:
  - receiving a disconnect order for an existing telephone service wherein said existing telephone service is provided by a first exchange carrier;
  - receiving a connect order for a new telephone service wherein said new telephone service is provided by a second exchange carrier;
  - installing a test cable to simulate said new telephone service;
  - verifying that said test cable performs correctly, wherein said verifying includes executing a test on said test cable responsive to a test instruction from a migration software application;
  - deactivating said existing telephone service, wherein said deactivating is automated in response to a deactivation command from said migration software application and is responsive to said verifying; and
  - activating said test cable to provide said new telephone service, wherein said activating is automated in response to an activation command from said migration software application and in response to said deactivating.

\* \* \* \* \*